Aug. 23, 1960 H. O. BALOUGH 2,950,224
BLANKET APPLYING AND REPLACING MEANS AND METHOD
Filed Dec. 12, 1958 6 Sheets-Sheet 3
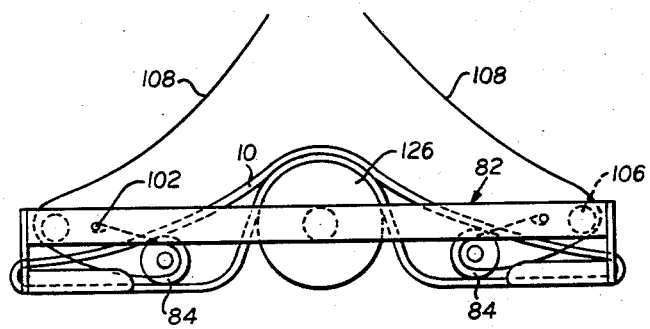
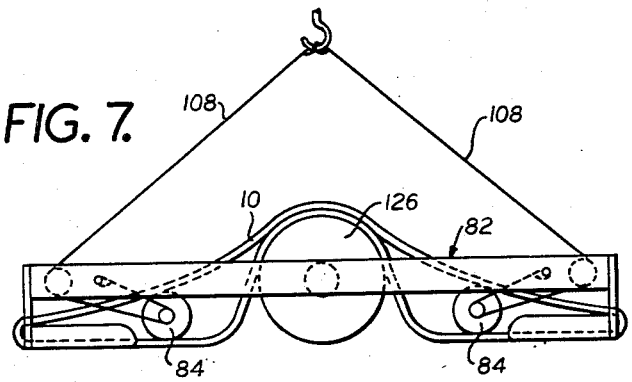
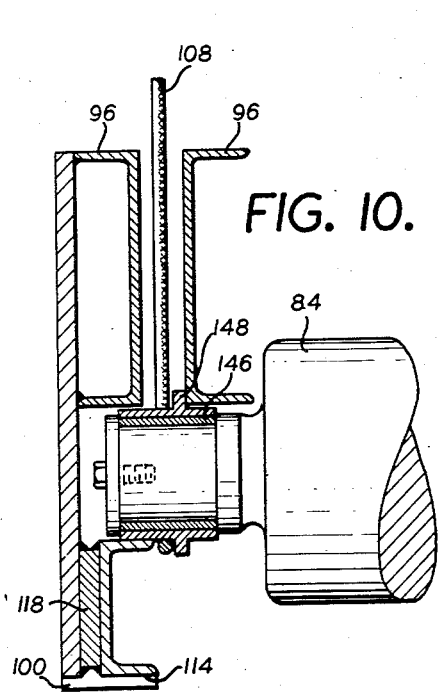
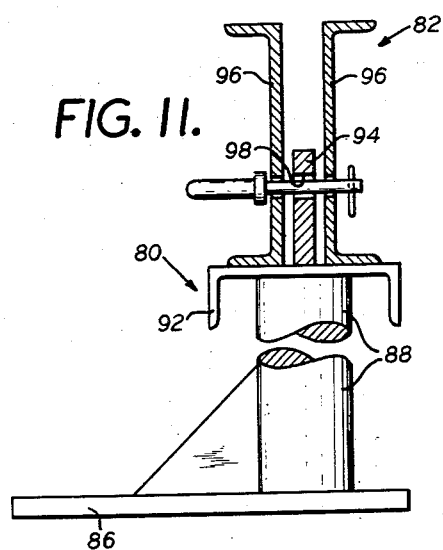
INVENTOR
HAROLD O. BALOUGH
BY
ATTORNEYS.

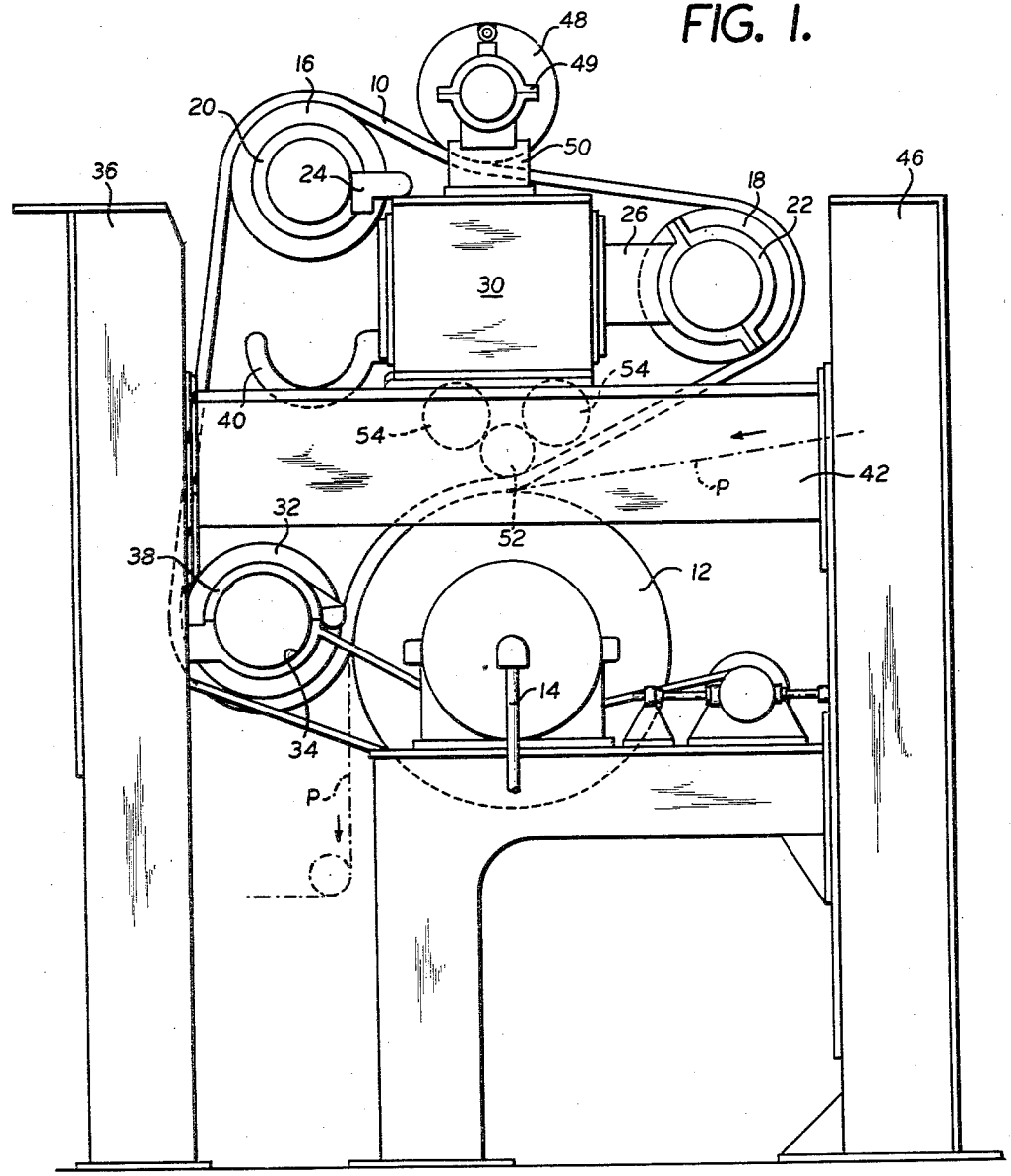

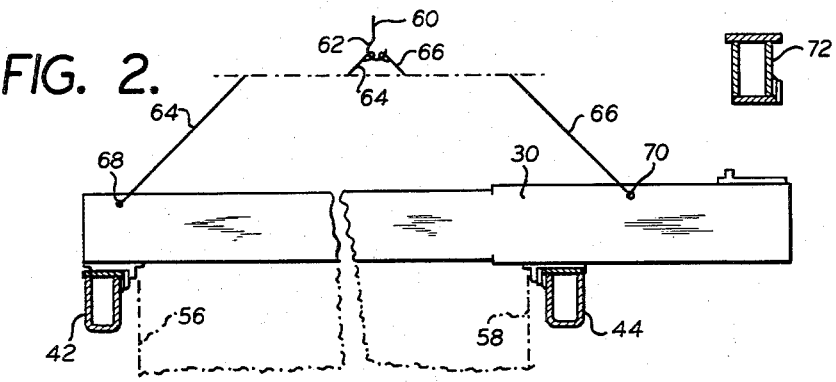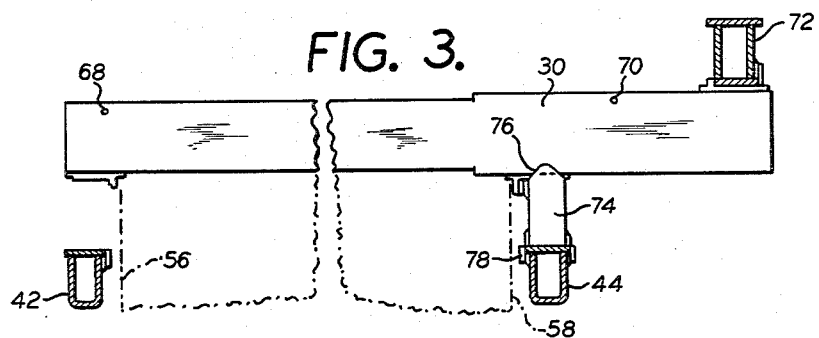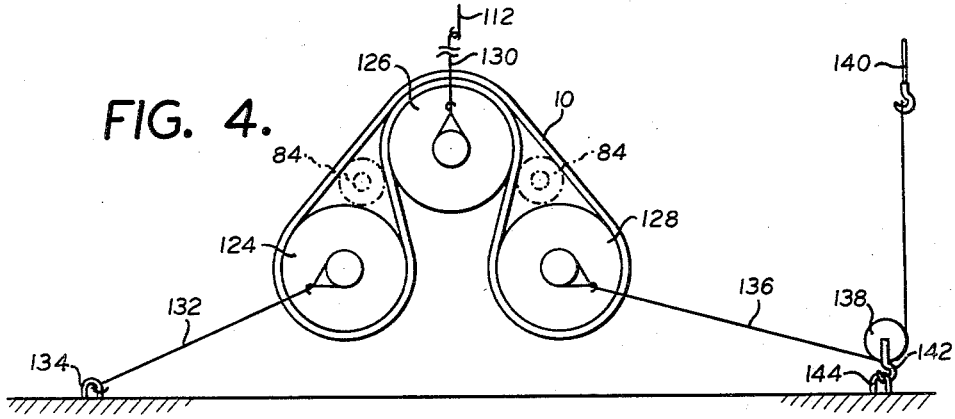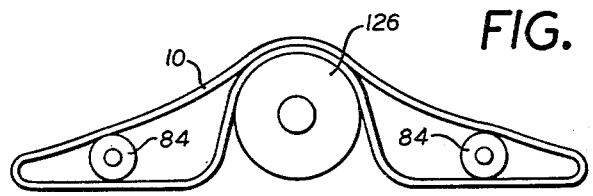

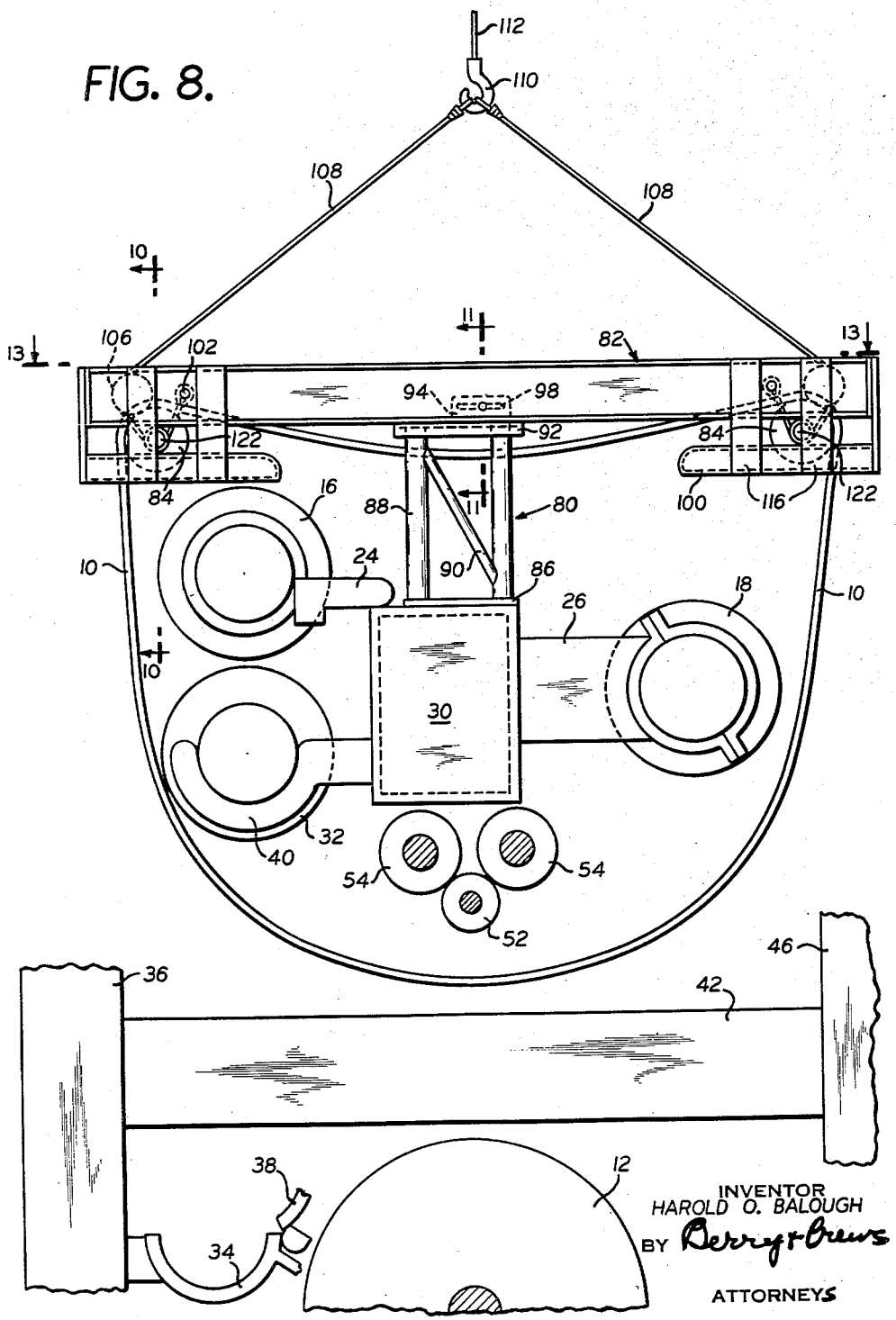

Aug. 23, 1960 H. O. BALOUGH 2,950,224
BLANKET APPLYING AND REPLACING MEANS AND METHOD
Filed Dec. 12, 1958 6 Sheets-Sheet 5
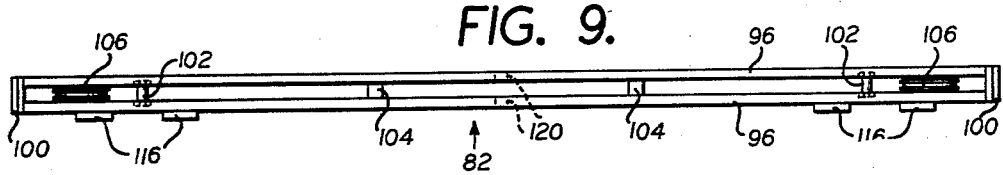
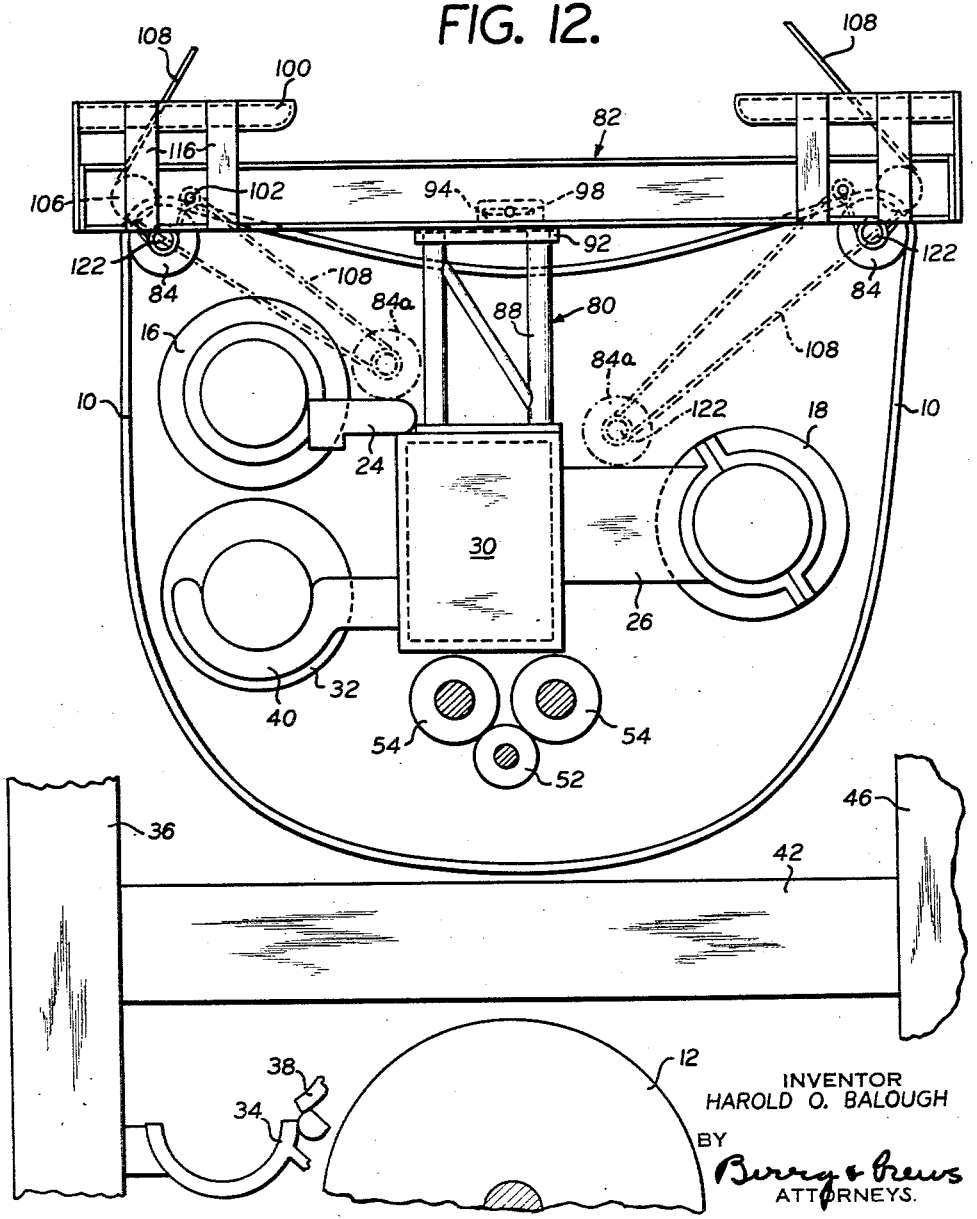
INVENTOR
HAROLD O. BALOUGH
BY
Berry & Brews
ATTORNEYS.

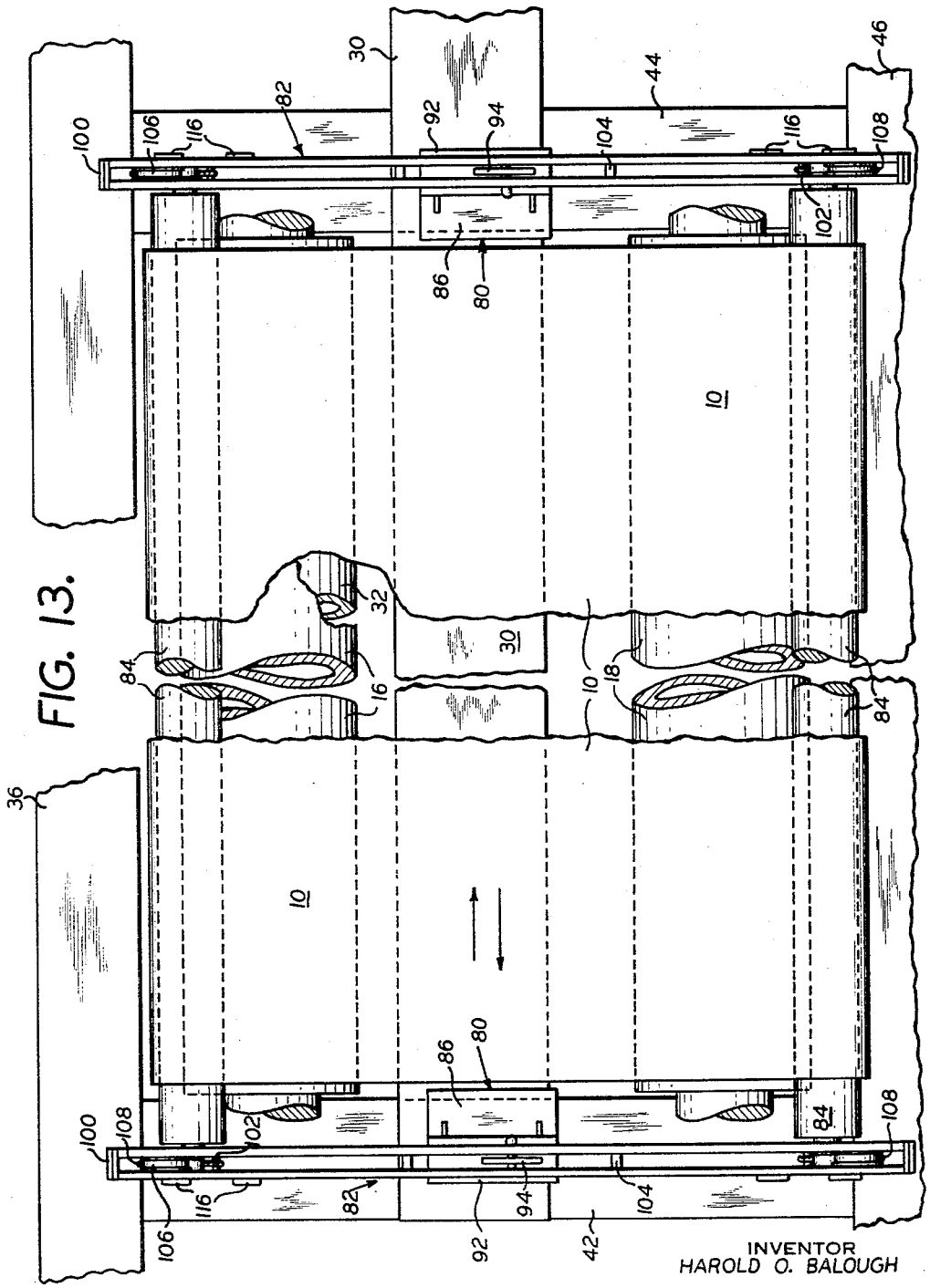

United States Patent Office 2,950,224
Patented Aug. 23, 1960

2,950,224

BLANKET APPLYING AND REPLACING MEANS AND METHOD

Harold O. Balough, Short Hills, N.J., assignor, by mesne assignments, to Clupak, Inc., New York, N.Y., a corporation of Delaware Filed Dec. 12, 1958, Ser. No. 780,084

12 Claims. (Cl. 162—199)

This invention relates to improvements in machines of the kind in which a heavy, broad, flexible, endless blanket is employed, and to procedures and devices used in removing a worn blanket from the machine and replacing it with a fresh blanket.

A typical illustrative machine, and the first commercial machine of its kind, in connection with which the present invention is practiced, is the No. 3 paper making machine in the Charleston, South Carolina mill of the West Virginia Pulp and Paper Company. The machine referred to is designed for making uncreped stretchable paper pursuant to Cluett Patent 2,624,245. The machine is generally a conventional paper making machine, but is characterized by the fact that it includes an extensible unit in which the paper web is fed lengthwise at a suitably chosen point in the dryer section to a nip formed by and between a heated drum and an opposed flexible blanket, the arrangement being such that the fibers of the web are pushed and crowded together while maintained under sufficient pressure between the blanket and the drum to prevent creping. The invention is not confined to machines used for shrinking paper webs to make them stretchable, but since it was contrived in connection with, and for, the particular machine referred to, that use will be described herein for illustrative purposes.

The illustrative machine produces a paper web which is over 200 inches wide and employs in the extensible unit a fabric backed, rubber blanket which is more than 200 inches wide and which weighs approximately four thousand pounds. The blanket is strung on a pair of supporting rollers and a stretch roller, the three rollers being triangularly related, with the stretch roller disposed below and outside the horizontal bounds of the supporting rollers. The blanket bears externally upon an arc of a cooperating heated drum, and is pressed against the drum at the introductory nip by a nip rod or roller.

All of the rollers span the blanket and the paper web path, and since they are required to be rigid they are necessarily massive. Access to the stretch roller and to the blanket from the front or operator's side of the machine is interfered with, moreover, by fixed supporting framework. As a result of the size and weight of the blanket and of all these other factors, withdrawal of a used blanket and the replacement thereof by a fresh The problem is accentuated by the fact that operation of the entire machine is necessarily interrupted during time is lost and output is substantially curtailed.

In accordance with the present invention the problem of changing blankets rapidly and efficiently is solved by a method and apparatus which includes a combination of several significant features:

(1) Provision is made for supporting the stretch roller temporarily from the cantilever beam in a position near to the beam and located within the lateral bounds of the supporting rollers so that the compass of the rollers is reduced and the blanket can hang from the supporting rollers without contact with the stretch roller;

(2) The blanket and the blanket supporting rollers are carried upon a beam which can be raised and temporarily supported, cantilever fashion, from the rear of the machine, to leave a clear exit path for the old blanket and a clear admission path for the new;

(3) Two strongbacks are brought into association with the front and rear, respectively, of the extensible unit, together with two carrying rods which are threaded through the blanket and then drawn to the ends of the strongbacks and away from one another by lifting cables. This provides sufficient spacing of the rods to cause the blanket to hang from clear of the beam and of all the parts carried by the beam, so that the supporting frame temporarily formed by the strongbacks and the rods can be shifted forward to carry the blanket unobstructedly away from the rollers and the beam and out of the machine at the front thereof;

(4) The strongbacks and the rods are then disassembled and separated from the old blanket, and are reassociated with the new one. The new blanket, supported by the rods and the strongbacks, is then raised through the lifting cables to an appropriate level and moved rearward into surrounding relation to the beam and the rollers carried the beam in the machine;

(5) Means are provided for temporarily supporting the strongbacks from the cantilever beam, and the lifting cables are then payed out to effect a controlled lowering of the rods and the blanket;

(6) The strongbacks, their temporary supports, and the rods are withdrawn, the beam and roller unit and the blanket are lowered to the normal operating level, and the stretch roller is then restored to its normal operating position.

Other objects and advantages will hereinafter appear.

In the drawing forming part of this specification—

Fig. 1 is a view in front elevation of the extensible unit of an illustrative machine for making stretchable paper;

Fig. 2 is a view in transverse sectional elevation showing principally the cantilever beam and longitudinal supporting beams upon which the cantilever beam normally rests;

Fig. 3 is a view similar to Fig. 2 but showing the cantilever beam supported, cantilever fashion, in a blanket removing and replacing position;

Fig. 4 shows a fresh blanket associated with three shipping poles in the course of being unloaded onto the floor;

Fig. 5 shows two of the shipping poles replaced by transfer rods;

Fig. 6 shows the preliminary association of strongbacks and cables with the transfer rods and the blanket;

Fig. 7 shows the cables being put under tension to draw the transfer rods to the ends of the strongbacks preparatory to lifting the rods, the strongbacks, and the blanket;

Fig. 8 is a view in front elevation showing the fresh blanket encompassing the beam and the rollers normally surrounded by the blanket, and ready to be lowered onto the supporting rollers;

Fig. 9 is a plan view of one of the strongbacks;

Fig. 10 is a sectional view taken on the line 10—10 of Fig. 8, looking in the direction of the arrows;

Fig. 11 is a sectional view taken on the line 11—11 of Fig. 8, looking in the direction of the arrows;

Fig. 12 shows the strongbacks, transfer rods and cables in place, after the cantilever beam has beem raised, for withdrawing a used blanket from the machine; and Fig. 13 is a plan view of the structure shown in Fig. 12 with parts broken away for compactness of illustration.

In Figs. 1, 2, 3, 8 and 12 disclosure is made of an extensible paper shrinking unit in a machine for continuously making stretchable paper. The illustrative machine is a machine in which paper is formed from pulp into a web, the shrinking operation being known as an "on machine" operation. Similar extensible units can be employed for "off machine" operations involving remoistening of the web and putting it through the unit for shrinking the paper to make it stretchable. The invention may also be utilized in machines for mechanically pre-shrinking woven fabrics, and in other mechanisms in which broad, massive belts or blankets are employed, as for power transmission, material conveying, and other purposes.

As has been mentioned, the extensible unit illustrated included a fabric backed rubber blanket 10 which is more than 20 feet wide and which weighs about two tons. The blanket 10 is pressed against a heated drum 12, which drum is provided with steam through a pipe 14. A web P of moist paper is fed between the blanket 10 and the drum 12 and, through a mode of operation not presently relevant but fully elucidated in Cluett Patent No. 2,624,-245 is shrunk without creping to increase its stretchability and toughness.

The blanket 10 is supported on carrier rollers 16 and 18, which rollers are mounted respectively in bearings 20 and 22. The bearings 20 and 22 are carried on brackets 24 and 26 which form unitary parts of a beam 30, herein termed a cantilever beam for a reason which will presently become apparent.

A stretch roller 32 is mounted in bearings 34, the lower halves of which are rigidly secured upon a frame column 36. Each bearing 34 has a hinged upper half 38 which may be locked down in operating position over the end bearings of the roller 32, but which may be released and swung out of the way when a blanket is to be changed.

The three rollers 16, 18 and 32 are triangularly related with the roller 16 providing running clearance for the blanket from the beam 30. It would be possible to operate without the roller 16 if the beam 30 were made sufficiently small to provide blanket running clearance with the blanket extending around rollers 18 and 32. However, as the roller 16 is normally provided, the present device will be described for such an extensible unit.

Cradle brackets 40 are affixed to the beam 30 to serve as a temporary support for the roller 32 during blanket changing. The brackets 40, and the rollers 32 when supported by the brackets, lie between or substantially between vertical lines tangent to the rollers 16 and 18, and are located alongside the beam 30 and below the roller 16.

The rollers 16, 18 and 32 and the beam 30 necessarily extend across the machine from front to rear a sufficient distance to support the entire width of the blanket 10.

These rollers and the beam are rigid and massive. The bearings 20 and 22 are provided in duplicate at the front and rear of the machine, but only the front bearings are illustrated. The beam 30 normally rests horizontally upon longitudinally extending front and rear longitudinal beams 42 and 44 (Figs. 1 and 2), to which it is removably secured. The beams 42 and 44 are fixedly supported at their ends by frame columns 36 and 46.

A guide roller 48, supported on the beam 30, may be bodily removed from the machine with its bearings and its supporting pedestals 50 when a worn blanket 10 is to be removed and replaced by a fresh blanket.

A nip roller or rod 52 and pressure rollers 54 are carried within the loop of the blanket 10 by the beam 30. The nip roller 52 is pressed forcibly against the blanket 10 by the pressure rollers 54. The structure includes provision for adjusting the rollers 52 and 54 relative to the beam 30, but since these parts are not required to be shifted from their normal positions relative to the beam 30, when changing blankets, no illustration or description of these features is required herein and the parts are illustrated as if fixedly supported by the beam.

When a worn blanket is to be removed, certain routine preliminary steps, such as removal of frame parts and a walk-way at the front of the machine, are first performed, but since these parts can be removed before the machine is stopped and replaced after the machine has been restarted, and do not enter into the present invention, they are not illustrated and will not be described in detail. The first steps with regard to the parts which are illustrated involve the removal of guide roller 48 with its bearings 49 and pedestals 50, and the transfer of roller 32 from the bearing 34 to the cradle brackets 40.

The normal positions of the front and rear edges of the blanket 10 relative to the beam 30 are indicated by broken lines 56 and 58 respectively, in Fig. 2. The beam 30, as will be seen in Fig. 2, extends at its rear end a considerable distance beyond the rear longitudinal beam 44. The purpose of the rearward protruding end of the beam 30 is to assist in supporting the beam 30 as a cantilever in a raised, blanket changing position in which the blanket may be caused to surround the beam and the rollers carried by it without contacting any of them and without being obstructed by the forward longitudinal beam 42.

A crane operated hoisting cable 60 having a terminal hook 62, is adapted to be connected to auxiliary cables 64 and 66 through eyes which are provided at the upper ends of the latter cables. The auxiliary cables 64 and 66 are also equipped with hooks at their free ends which are adapted to be inserted through eyes 68 and 70 at the front and rear ends of the beam 30. The crane (not shown) may be operated to lift the beam 30 from the position of Fig. 2 to the position of Fig. 3 with the rear extremity of the beam 30 bearing upward against a fixed abutment member 72, and then to lift the forward end of the beam 30 a little farther so that a temporary supporting pedestal 74 having flanges or ears 76 at its upper end and flanges 78 at its lower end may be worked into place upon the rear beam 44 and beneath the beam 30. As an alternative to the employment of the abutment member 72, a tie bar (not shown) may be made to extend downward from the rear end of the beam 30 and may be utilized to limit upward movement of the rear end of the beam 30.

The beam 30 is then lowered to the horizontal position of Fig. 2 and the pedestal 74 is temporarily bolted or otherwise detachably secured to the beams 44 and 30, whereupon the crane cable is payed out a little and the cables 64 and 66 are detached from the beam 30. The rollers 52, 54 and 32 are in this way raised high enough so that when the blanket 10 is freely suspended in the manner which will now be described, the backed blanket 10 will surround the beam 30 and all the rollers carried by it without touching any of them, and will have its lower end disposed above the level of the top of the beam 42.

In order that the blanket, itself, may clear the rollers and the front longitudinal beam 42, it is necessary that the blanket be further raised relative to the beam 30 and the rollers carried by it, and that the blanket be spread at the top beyond the lateral boundaries of the rollers 16 and 18, as illustrated in Fig. 12. To this end pedestals 80 (Figs. 8, 11 and 12) are temporarily mounted on the beam 30 just beyond the front and rear boundaries of the blanket 10, and strongbacks 82 (Figs. 6 to 12) are mounted on the pedestals 80.

Transfer rods 84 (Figs. 5 to 7, 10 and 12) in the form of eight inch diameter pipes are then worked through beneath the upper portion of the blanket 10 in preparation for raising the blanket to the condition illustrated in Fig. 12. Insertion of the rods is effected by clamping collars or chokers (not shown) to one of the rods, one at the forward end of the rod and the other substantially behind the center of gravity of the rod. The chokers are connected to a crane and used for lifting the rod part way into the machine where its rear end may be placed on previously inserted wooden blocks for support from the beam 30. The rear choker is then removed and the rod is slid rearward by the crane to the desired position, whereupon the forward choker is removed. The other rod is then similarly inserted.

Each pedestal 80 (see Figs. 11 and 12) comprises a broad base 86, a pair of tubular uprights 88, a diagonal brace 90 and a flanged head 92. A fin bar 94 (Figs. 8 and 11), unitary with the head 92, extends upward from the head along the middle thereof for fitting between, and for being secured to, spaced, parallel channel bars 96 of the associated strongback 82. The fin bar 94 is formed with a longitudinally extending slot 98. The base of the pedestal 80 may be temporarily bolted or otherwise detachably secured to the beam 30.

Each strongback (see Figs. 6–12) comprises parallel channel bars 96 which are connected to one another through end plates 100. The bars are drawn toward one another intermediate their ends by bolt and nut combinations 102 and are spaced from one another by fixed spacer bars 104. Pulleys 106 are rotatively supported between the end portions of the spaced channel bars 96, and cables 108 having loops disposed around the bolts of the bolt and nut combinations 102 are passed around the outer sides of the respective pulleys. The cables 108 have loops at their free ends also, whereby they may be readily attached to, and detached from, hooks 110 of front and rear crane cables 112. Shoes 114 in the form of channel bars (Fig. 10) are carried by the end plates 100 and by plates 116 and spacers 118. The shoes are not used, however, in withdrawing the worn blanket from the machine. They will be referred to again in connection with the introduction of a fresh blanket.

When the pedestals 80 have been mounted upon, and secured to, the beam 30, the strongbacks 82 are put in place upon the pedestals, each strongback being placed to receive between the channel bars 96 thereof the fin 94 of the associated pedestal 80. The strongback 82 is adjusted to align openings 120 of the strongback with the slot 98 of the fin 94. A headed pin then has its shank inserted through the openings 120 and the slot 98, and is cottered.

The pedestals 80 support the strongbacks 82 while there is slack in the cables 108. Other means may, of course, be used for this purpose if desired.

The cables are next passed around end bearings 122 of the transfer rods 84 with the rods in the positions designated 84a in Fig. 12, and have their free ends connected to the hooks 110 of the crane cables 112 (front and rear). The cranes are next operated to draw the transfer rods 84 upward and outward from substantially the dotted line positions 84a of Fig. 12 to the full line positions in that figure, thereby placing the blanket 10 in the position and the condition illustrated in Fig. 12.

The rods are naturally and easily drawn to the outer ends of the strongbacks as they are drawn upward and become firmly and precisely placed and held against the lower face of the strongbacks, each between a pulley 106 and a bolt and nut combination 102, for as long as the cable is drawn upward with sufficient force to sustain the blanket 10, the transfer rolls 84 and the strongbacks 82.

The strongbacks 82 may now be detached from the pedestals and, with the strongbacks raised a little further, the pedestals can, if desired, be removed from the beam 30. The cranes may then be operated to carry the blanket forward clear of the machine, and to lower it to the floor or into a waiting truck. The strongbacks 82 may then be separated from the blanket and the rods, and the rods may be extracted.

The transfer rods and the strongbacks just released can then be used in effecting the transfer of a fresh blanket into the machine, but if desired, in order to save time, a duplicate set of transfer rods and strongbacks may already have been associated with the fresh blanket for that purpose. The details of handling the fresh blanket, will, in either case, be as illustrated in Figs. 4 to 8.

The fresh blanket 10 is received in a shipping box, not shown, in which it is trained upon two shipping poles 124 and 128 and wrapped around a third pole 126, each pole being about twenty-five inches in diameter (see Fig. 4). After opening of the box by removing the cover, cables 130 are looped around hub projections of the pole 126 and are attached to crane cables 112. The blanket and pulley assembly is then lifted by the cranes from the box and lowered toward the floor. At an intermediate stage (Fig. 4) cables 132 are passed around the hub projections of the pole 124 and are anchored to shackles 134, which shackles can be raised to a limited extent as shown but are normally sunk in the floor below the floor level. A further cable 136 is looped around the hub projection of the pole 128, is passed around a pulley 138, and is connected to a crane cable 140. The pulley 138 is anchored through a hook 142 to a floor shackle 144 which is similar to the shackle 134. Tension on the cables 132, 136 and 140 causes the poles 124 and 128 to be pulled apart as the assembly is lowered to the floor.

With the assembly resting lightly on the floor, or suspended near the floor in the arrangement of Fig. 4, transfer rods 84 of eight inch diameter are inserted through the blanket, as indicated in dotted lines in Fig. 4. The assembly is then set down on the floor. The cables 120 have their lower ends transferred from the pole 126 to one of the rods 84, and additional cables 120 are connected from the cables 112 to the ends of the other rod 84. The rods 84 are then lifted a short distance to take the blanket weight off the poles 124 and 128, and the poles 124 and 128 are withdrawn. The rods 84 are then lowered to lie within the blanket loop upon the floor as shown in Fig. 5.

The strongbacks 82 are next associated with the end bearings of the rods 84 at opposite ends of the rods and alongside the blanket, in the manner illustrated in Fig. 6. In effecting this association each end bearing 146 of the rod is caused to have an integral flange portion 148 (Fig. 10) received between the channel bars 96 of the strongback and engaged or substantially engaged with the channel bar which lies nearer to the rod end. The cables 108 are next looped around the rod bearings 146 and connected to the cables 112. The rods 84 are long enough to cause the strongbacks to extend clear of the pole 126, when engaged with the rods.

The cables 112 are then raised and shifted by the cranes, first to draw the rod ends outward to the ends of the strongbacks, and then to raise the strongbacks 82, the transfer rods 84 and the blanket 10, and then to carry them horizontally into the positions illustrated in Fig. 8, and to hold them stationary until the pedestals 80 have been put in place on the beam 30 and secured to the beam 30 and to the strongbacks 82 as previously described.

The cables 112 are then gently eased away to deprive the blanket gradually of cable support. As this is done, the weight of the blanket draws the transfer rod bearings 146 inward along the shoes 114, thence downward along the rounded inner ends of the shoes, and on downward until the blanket has assumed a natural draped condition on the rollers 16 and 18 and the transfer rollers have left engagement with the blanket and have come to rest on wooden blocks (not shown) which have been temporarily set on the beam 30 and the brackets 26. The strongbacks 82 and the pedestals 80 can be removed together from the machine by the cranes.

The rods 84 are next withdrawn by the use of chokers, the procedure being the reverse of that described for the introduction of rods when a worn blanket is being removed. The pedestal 74 is next withdrawn, and the beam 30 is restored to its normal operating position and secured in place. The stretch roller 32 is thereafter removed from the cradle brackets 40 and returned to the bearings 34 by the cranes. The guide roller 48 is finally put in place, making the machine ready for resumption of operation.

Mechanical locating or jigging means may be provided on, or in connection with, the beams and pedestals with great practical advantage, but since expedients of this kind are well-known and well understood they form no part of the invention and they have not been shown or described herein.

The term blanket as used in the appended claims, unless precluded by the immediate context, is intended to include any broad, massive, endless belt, screen or band which presents a problem of removal and introduction analogous to that described herein, to which the presently disclosed solution is applicable.

While certain preferred embodiments and procedures have been illustrated and described in detail, it is to be understood that changes may be made therein and the invention embodied in other structures and procedures. It is not, therefore, the intention to limit the patent to the specific construction and procedure illustrated, but to cover the invention broadly in whatever form its principles may be utilized.

I claim:

1. The method of introducing a broad, massive, endless blanket into a machine in which the blanket is destined normally to be trained upon a plurality of rollers including at least a carrier roller and a stretch roller, and to be located behind a portion of the permanent frame of the machine: which method comprises, relocating the stretch roller to a position which reduces the compass of the rollers, raising the rollers together to carry the rollers in unison clear of the permanent frame structure, supporting the rollers with a clear overhang from behind the blanket path through the front of the machine, providing a temporary support for the blanket of broader span than the rollers, mounting the blanket in freely suspended condition on said temporary support, carrying the suspended blanket into roller encompassing position, and depositing the blanket gently onto the rollers.

2. A method of introducing a broad, massive, endless, flexible blanket into an operative position in a machine from the front or operator's side thereof, in which position the blanket will be disposed in part behind an obstructing front frame member, and will be trained upon parallel carrier rollers which are supported by a transverse beam that extends parallel to the roller axes, and upon a stretch roller, which method comprises, transferring the stretch roller from its normal position to a position on the beam nearer to the carrier rollers for reducing the compass of the structure around which the blanket must be received, raising the beam to a position in which the beam and all rigid structure carried by the beam including the rollers, stand clear of the normally obstructing front frame member and have a free overhang from behind the normal blanket path forward, inserting a pair of transfer rods through the blanket, lifting the blanket through the rods while maintaining a predetermined spacing of the rods and, with the blanket freely suspended from the rods, shifting it rearward to surround the beam and the beam carried structure including the rollers, lowering the transfer rods gently for depositing the blanket into place, and thereafter returning the beam assembly and the stretch roller to their normal operating positions.

3. A method of introducing a broad, massive, endless, flexible blanket into an operative position in a machine from the front or operator's side thereof, in which position the blanket will be disposed in part behind an obstructing front frame member, and will be trained upon parallel carrier rollers which are supported by a transverse beam that extends parallel to the roller axes, and upon a stretch roller, which method comprises, transferring the stretch roller from its normal position to a position on the beam nearer to the carrier rollers for reducing the compass of the structure around which the blanket must be received, raising the beam to a position in which the beam and all rigid structure carried by the beam including the rollers, stand clear of the normally obstructing front frame member and have a free overhang from behind the normal blanket path forward, inserting a pair of transfer rods through the blanket, associating with the rods at the front and rear of the blanket, strongbacks which have cables anchored to them near their ends and guided upward through them, looping the cables around the rod ends below the strongbacks and bringing together the free ends of the cables associated with each strongback, lifting the blanket through the cables, the strongbacks and the rods with the blanket freely suspended from the rods and shifting it rearward by means of the cables into surrounding relation to the beam and the beam carried structure, supporting the strongbacks on the beam, paying out the cables for lowering the transfer rods and thereby lowering the blanket gently into place, and thereby returning the beam assembly and the stretch roller to their normal operating positions.

4. A method of introducing a broad, massive, endless, flexible blanket into an operative position in a machine from the front or operator's side thereof, in which position the blanket will be disposed in part behind an obstructing front frame member, and will be trained upon parallel carrier rollers which are supported by a transverse beam that extends parallel to the roller axes, and upon a stretch roller, which method comprises, transferring the stretch roller from its normal position to a position on the beam nearer to the carrier rollers for reducing the compass of the structure around which the blanket must be received, raising the beam to a position in which the beam and all rigid structure carried by the beam including the rollers, stand clear of the normally obstructing front frame member and have a free overhang from behind the normal blanket path forward, inserting a pair of transfer rods through the blanket, associating with the rods at the front and rear of the blanket, strongbacks which have cables anchored to them near their ends and guided upward through them, looping the cables around the rod ends below the strongbacks and bringing together the free ends of the cables associated with each strongback, drawing the rods to the ends of the strongbacks by tensioning the cables, lifting the blanket through the cables, the strongbacks and the rods with the blanket freely suspended from the rods, and shifting it rearward to surround the beam and the structure carried by the beam, supporting the strongbacks on the beam, paying out the cables for lowering the transfer rods and thereby lowering the blanket gently into place, and thereafter returning the beam assembly and the stretch roller to their normal operating positions.

5. A method of introducing a broad, massive, endless, flexible blanket into an operative position in a machine from the front or operator's side thereof, in which position the blanket will be disposed in part between front and rear frame members, and will be trained upon parallel carrier rollers which are supported by a transverse beam that extends parallel to the roller axes and a stretch roller which is mounted on the frame independently of the beam, which method comprises, transferring the stretch roller to the beam and nearer to the carrier rollers for reducing the compass of the structure around which the blanket must be received, raising the beam to a position in which the rollers, the beam and all rigid structure carried by the beam stand clear of the normally obstructing front frame member and have a free overhang from behind the normal blanket path forward, inserting a pair of transfer rods through the blanket, associating with the rods at the front and rear of the blanket, strongbacks which have cables anchored to them near their ends and guided upward through them, looping the cables around the rod ends below the strongbacks and bringing together the free ends of the cables associated with each strongback, lifting the blanket through the cables, the strongbacks and the rods with the blanket freely suspended from the rods and shifting it rearward to surround the beam and the structure carried by the beam, supporting the strongbacks on the beam, paying out the cables for lowering the transfer rods and thereby lowering the blanket gently into place, and thereafter returning the beam assembly and the stretch roller to their normal operating positions.

6. The method of removing a broad, massive, endless blanket from a machine in which the blanket is normally trained upon a plurality of rollers including at least a carrier roller and a stretch roller, and located behind a portion of the permanent frame structure of the machine; which method comprises relocating the stretch roller to reduce the compass of the rollers, raising the rollers and the blanket together to carry the rollers in unison clear of the frame structure, supporting the rollers with a clear overhang from behind the blanket path through the front of the machine, providing a temporary support for the blanket of broader span than the rollers, drawing the blanket into freely suspended condition on said temporary support so that it is held clear of the rollers and of the permanent frame structure, and moving the blanket so suspended out of the machine in a direction parallel to the rollers.

7. A method of removing a broad, massive, endless flexible blanket to the front or operator's side of a machine from an operative position in the machine in which the blanket is disposed in part behind an obstructing front frame member, and is trained upon parallel carrier rollers which are supported by a transverse beam that extends parallel to the roller axes, and upon a stretch roller, which method comprises, transferring the stretch roller from its normal position to a position on the beam nearer to the carrier rollers for reducing the compass of the structure around which the blanket extends, raising the beam to a position in which the beam and all rigid structure carried by the beam including the rollers, stand clear of the normally obstructing front frame member and have a free overhang from behind the normal blanket path forward, inserting a pair of transfer rods through the blanket, disposing the rods in parallel relation and at predetermined distances from another, lifting the blanket through the rods to a position in which it is freely suspended from the rods, clear of the obstructing front frame member and out of contact wtih the beam and the beam carried structure including the rollers, and carrying the so suspended blanket forward out of the machine.

8. A method of removing a broad, massive, endless, flexible blanket to the front or operator's side of a machine from an operative position in the machine in which the blanket is disposed in part behind an obstructing front frame member and is trained upon parallel carrier rollers which are supported by a transverse beam that extends parallel to the roller axes, and upon a stretch roller, which method comprises, transferring the stretch roller from its normal position to a position on the beam nearer to the carrier rollers for reducing the compass of the structure around which the blanket extends, raising the beam to a position in which the beam and all rigid structure carried by the beam including the rollers, stand clear of the normally obstructing front frame member and have a free overhang from behind the normal blanket path forward, inserting a pair of transfer rods through the blanket, mounting on the beam at the front and rear of the blanket, strong backs which have cables anchored to them near their ends and guided upward through them, looping the cables around the rod ends below the strongbacks and bringing together the free ends of the cables associated with each strongback, lifting the blanket through the cables until the rods have been carried into engagement with the ends of the strongbacks with the blanket freely suspended from the rods and then shifting the cables forward to carry the blanket clear of the beam and the structure carried by the beam.

9. A device adapted for use with transfer rods for moving broad, massive, flexible, endless blankets into and out of a machine, comprising a strongback which includes a pair of rigid parallel bars secured to one another in fixed, spaced relation, pulleys mounted between the bars near opposite ends thereof, cable anchorages extending between the bars adjacent to, but inward from, the respective pulleys, and cables secured to the respective anchorages and passed between the bars at the outer sides of the respective pulleys.

10. A temporary framework adapted for use in transferring broad, massive, flexible, endless blankets into and out of a machine comprising, in combination, a pair of transfer rods inserted through a blanket, a pair of strongbacks respectively associated with the rods along the front and back edges of the blanket, and constituting rigid carriers and spacers for the rod, and lifting cables anchored respectively near the opposite ends of each strongback, each looped about an associated rod end, and passed through the strongback near the point at which it is anchored thereto, the construction and arrangement being such that the rods are held in predetermined, fixed positions near the ends of the strongbacks by the tension of the cables to control the span of the suspended blanket loop, but may be caused to effect gentle and controlled easing away of the rods and the blanket in response to controlled relaxation of the cable tension.

11. A temporary framework adapted for use in transferring broad, massive, flexible, endless blankets into and out of a machine comprising, in combination, a pair of transfer rods inserted through a blanket, a pair of strongbacks associated with the rods along the front and back edges of the blanket and constituting rigid carriers and spacers for the rods, each strongback including a pair of rigid, parallel bars secured to one another in fixed spaced relation, pulleys mounted between the bars near opposite ends thereof, cable anchorages extending between the bars adjacent to, but inward from, the respective pulleys, and lifting cables secured to the respective anchorages and passed between the bars around the outer sides of the respective pulleys, the construction and arrangement being such that the rods are held in predetermined, fixed positions near the ends of the strongbacks by the tension of the cables to control the span of the suspended blanket loop but may be caused to effect a gentle and controlled easing away of the rods in response to controlled relaxation of the cable tension.

12. A combination of paper treating machinery which includes a broad, massive, endless blanket, with temporary auxiliary mechanism designed to facilitate withdrawal and replacement of the blanket, comprising, the combination with the blanket itself of a plurality of rollers upon which the blanket is normally trained, including at least a pair of carrying rollers and a stretch roller, a beam upon which the carrier rollers are mounted, bracket means on the beam on which the stretch roller may be mounted during blanket changing to reduce the compass of the rollers and to enable the stretch roller to be raised along with the blanket and the other rollers, means providing a temporary cantilever support for holding the beam in a raised position in which the beam and the rollers stand clear of an otherwise obstructing portion of the permanent machine frame, and have a clear overhang from behind the normal path of the blanket through the front of the machine, a pair of strongbacks mounted on the beam to the front and rear of the blanket, a pair of transfer rods threaded through the blanket, and lifting cables anchored near the ends of the strongbacks, looped around the associated ends of the transfer rods, and passed upward through the strongbacks, said cables serving to draw the transfer rods to the ends of the strongbacks and support them there in such relation to one another that the blanket is caused to be freely suspended from the rods with a sufficient span and compass to surround the rollers without contacting any of them.

References Cited in the file of this patent

UNITED STATES PATENTS

| | | |
|---|---|---|
| 1,678,176 | Berry | July 24, 1928 |
| 1,715,528 | Aldrich et al. | June 4, 1929 |
| 1,816,754 | White | July 28, 1931 |
| 1,907,204 | Laussucq | May 2, 1933 |
| 2,039,780 | Darby | May 5, 1936 |